United States Patent
Whalley

(10) Patent No.: US 10,975,904 B2
(45) Date of Patent: Apr. 13, 2021

(54) CLEARANCE FLOATING ANCHOR NUT

(71) Applicant: HS Marston Aerospace Limited, Wolverhampton (GB)

(72) Inventor: Stephen Whalley, Telford (GB)

(73) Assignee: HS MARSTON AEROSPACE LIMITED, Wolverhampton (GB)

( * ) Notice: Subject to any disclaimer, the term of this patent is extended or adjusted under 35 U.S.C. 154(b) by 207 days.

(21) Appl. No.: 16/123,088

(22) Filed: Sep. 6, 2018

(65) Prior Publication Data

US 2019/0093695 A1 Mar. 28, 2019

(30) Foreign Application Priority Data

Sep. 26, 2017 (EP) .................................... 17193348

(51) Int. Cl.
*F16B 37/04* (2006.01)
*F16B 39/02* (2006.01)

(52) U.S. Cl.
CPC .......... *F16B 37/046* (2013.01); *F16B 37/044* (2013.01); *F16B 39/026* (2013.01)

(58) Field of Classification Search
CPC ..... F16B 37/046; F16B 37/044; F16B 39/026
USPC .................................................. 411/103, 111
See application file for complete search history.

(56) References Cited

U.S. PATENT DOCUMENTS

| | | | | |
|---|---|---|---|---|
| 2,815,789 A * | 12/1957 | Hutson | ................. | F16B 37/044 411/111 |
| 3,144,895 A | 8/1964 | Linger | | |
| 3,640,327 A * | 2/1972 | Burt | ........................ | F16B 37/04 411/108 |
| 4,488,844 A * | 12/1984 | Baubles | ................ | F16B 37/045 411/103 |
| 4,768,907 A * | 9/1988 | Gauron | ................. | F16B 37/044 411/112 |
| 5,006,025 A * | 4/1991 | Duran | ................... | F16B 5/0208 411/108 |
| 8,277,158 B2 | 10/2012 | Csik et al. | | |

FOREIGN PATENT DOCUMENTS

| | | |
|---|---|---|
| EP | 0391764 A1 | 10/1990 |
| EP | 3054175 A1 | 8/2016 |
| FR | 2871535 A1 | 12/2005 |

OTHER PUBLICATIONS

Extended European Search Report for International Application No. 17193348.4 dated Mar. 13, 2018, 7 pages.

* cited by examiner

*Primary Examiner* — Jack W Lavinder
(74) *Attorney, Agent, or Firm* — Cantor Colburn LLP

(57) ABSTRACT

A floating anchor nut configured to receive a bolt is described. The floating anchor nut comprises a plate having a bolt aperture and retention features for retaining a nut. The floating anchor nut additionally comprises the nut that itself comprises an internally threaded body and a flange extending from an outer surface of the body, the nut being retained through interaction of the flange with the retention features, the retention features allow limited parallel displacement with respect to a plane of the plate. The flange is positioned along the body so that at least a portion of the body is counter-sunk into the bolt aperture of the plate.

14 Claims, 7 Drawing Sheets

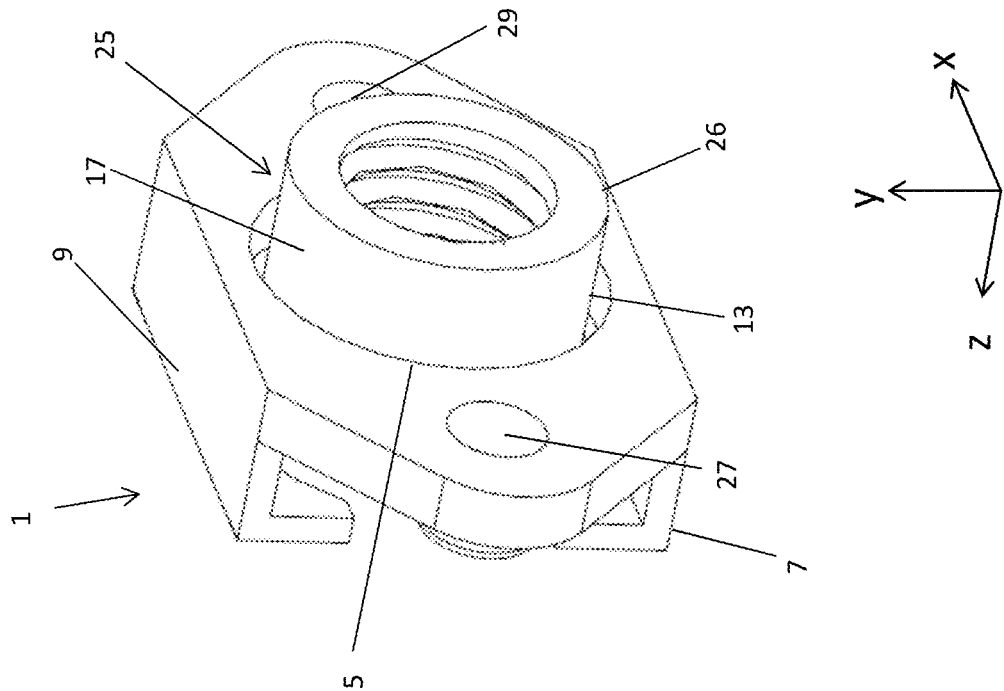
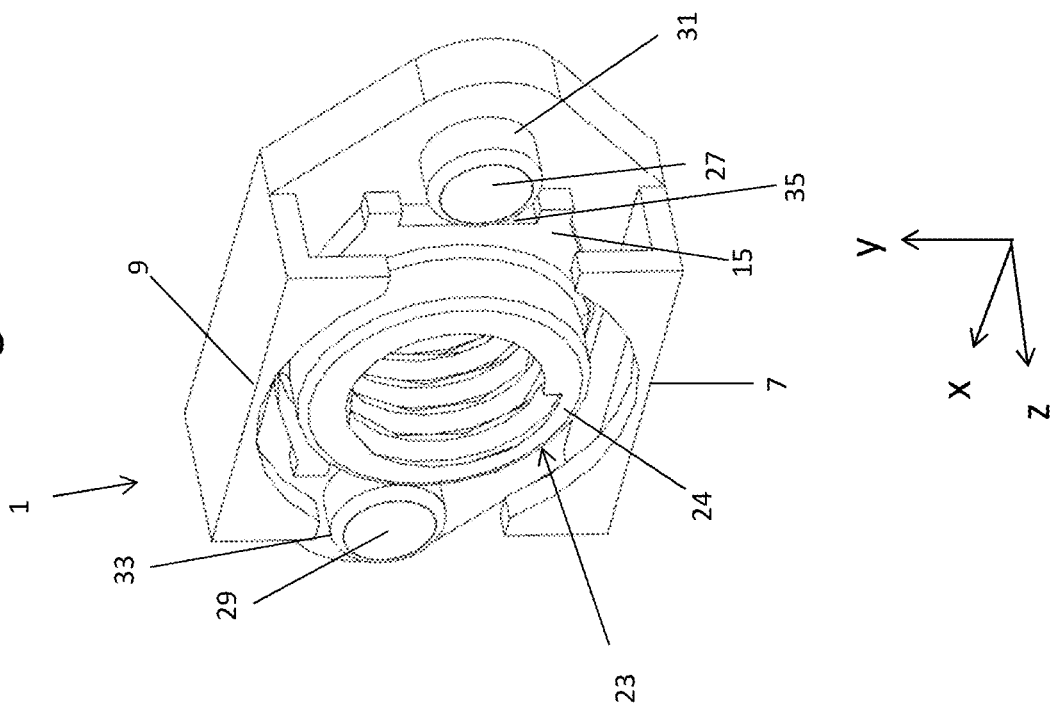

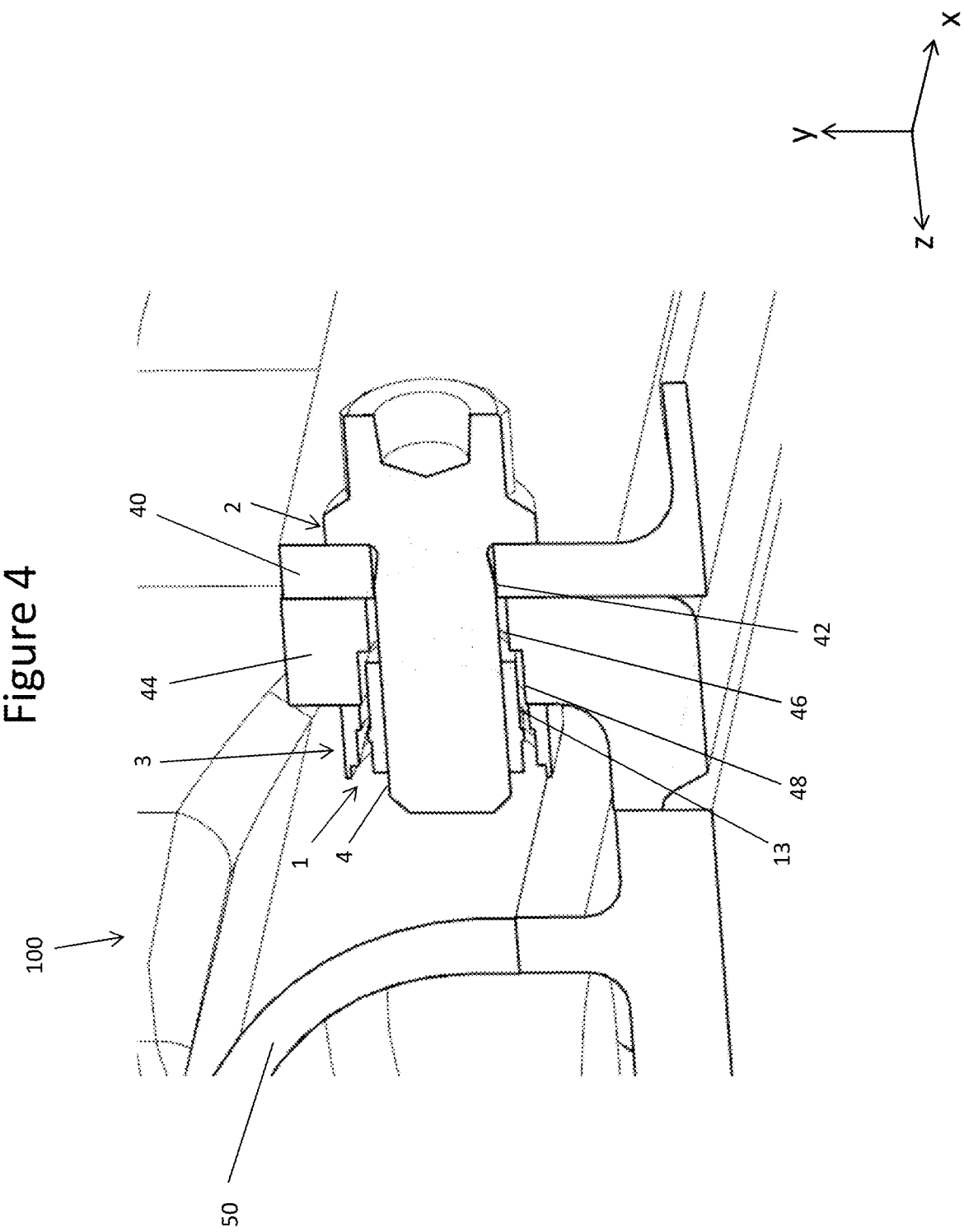

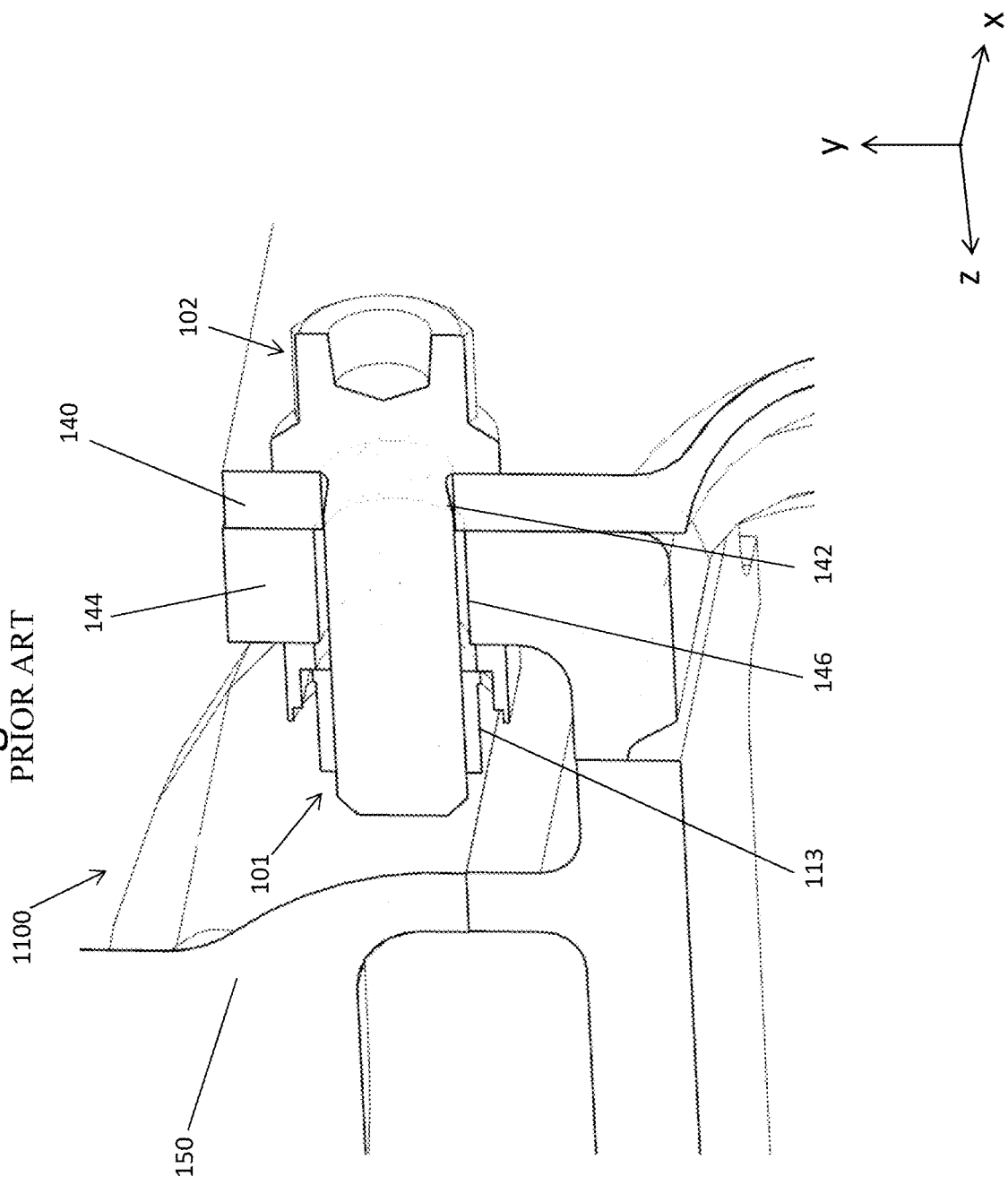

CLEARANCE FLOATING ANCHOR NUT

FOREIGN PRIORITY

This application claims priority to European Patent Application No. 17193348.4 filed Sep. 26, 2017, the entire contents of which is incorporated herein by reference.

FIELD

The present disclosure relates to a floating anchor nut and to a fastener assembly comprising the floating anchor nut with improved blindside clearance.

BACKGROUND

Floating anchor nuts are often used with bolts in fastening situations where access to the nut is impaired. In particular, they can be useful to clamp two components together with a pre-set tensile loading while accounting for some misalignment in the components due to manufacturer's tolerances.

Floating anchor nuts are used in the production of aircrafts, particularly in gas turbine engines, where it is not uncommon to find many hundreds of floating anchor nuts being used.

The currently available floating anchor nuts can be difficult to use in situations where there is limited blindside clearance. In worse case scenarios, the bolt can impinge part of a component lying behind the floating anchor nut.

SUMMARY

According to a first aspect, the present disclosure can be seen to provide a floating anchor nut which is configured to receive a bolt. The floating anchor nut comprises: a plate and a nut. The plate has a bolt aperture and retention features for retaining the nut. The nut comprises an internally threaded body and a flange extending from an outer surface of the body. The nut is retained through interaction of the flange with the retention features, the retention features allow for limited parallel displacement with respect to a plane of the plate. The flange is positioned along the body so that at least a portion of the body is counter-sunk into the bolt aperture of the plate.

In addition to the features described above, the body of the nut may be generally cylindrical and the bolt aperture may be a circular aperture having a diameter larger than the diameter of the body. The nut may be displaceable within an annular region of clearance in the bolt aperture. Optionally the body may project through the bolt aperture to protrude through the plane of the plate.

In addition to one or more of the features described above, or as an alternative to any of the foregoing embodiments, the flange may be positioned at a distal end of the body such that the body of the nut has a single portion extending between the flange and a proximal end of the body.

In addition to one or more of the features described above, or as an alternative to any of the foregoing embodiments, the flange is provided partway along the body such that a distal end portion of the body protrudes from one side of the flange and a proximal end portion of the body protrudes from the other side of the flange. The flange may be provided less than halfway along the length of the body from the distal end. For example, the flange may be provided around a third of the way along the length of the body from the distal end.

In addition to one or more of the features described above, or as an alternative to any of the foregoing embodiments, the internal thread of the body in the distal end portion may be deformed. For example, the internal thread of the body in the distal end portion may be ovalised.

In addition to one or more of the features described above, or as an alternative to any of the foregoing embodiments, the plate may have a first retention feature and a second retention feature arranged on opposite sides of the bolt aperture that interact with the flange.

In addition to one or more of the features described above, or as an alternative to any of the foregoing embodiments, the plate may have a first opening and a second opening each configured to receive a fastener. The first opening may have a first lip and the second opening may have second lip. Alternatively or additionally, the flange may have a first recess and a second recess, the first recess being configured to provide room for a fastener received in the first opening and/or the first lip and the second recess being configured to provide room for a fastener received in the second opening and/or the second lip.

In addition to one or more of the features described above, or as an alternative to any of the foregoing embodiments, the flange may extend circumferentially around the outer surface of the body.

According to a second aspect, the present disclosure can be seen to provide a fastener assembly comprising a bolt having a threaded shaft and a floating anchor nut in accordance with any one of the foregoing statements.

According to a third aspect, the present disclosure can be seen to provide an assembly comprising a first component, a second component, the floating anchor nut accordance with any one of the foregoing statements and a bolt having a threaded shaft. The first component has a first hole extending therethrough. The second component is arranged adjacent to the first component and has a second hole extending therethrough. The first and second components are arranged such the first hole is adjacent to and aligned with the second hole. The plate of the floating anchor nut is fastened to the second component such that the bolt aperture is aligned with the second hole. A portion of the body of the nut extends through the bolt aperture. The threaded shaft of the bolt extends through the first and second holes and is received in the internally threaded body, whereby the first component and the second component are fastened together.

In addition to one or more features described above, or as an alternative to any of the foregoing embodiments, the second component may include a counter-bore (48) aligned with the second hole. The plate may be fastened to the second component such that the bolt aperture is aligned with the counter-bore. A portion of the body of the nut may then protrude through the bolt aperture to be accommodated in the counter-bore.

In addition to one or more features described above, or as an alternative to any of the foregoing embodiments, the threaded shaft may extend through the body and may protrude by at least two full thread pitches beyond the body.

In addition to one or more of the features described above, or as an alternative to any of the foregoing embodiments, the assembly may be an air cooled oil cooler assembly of a gas turbine engine.

According to a fourth aspect, the present disclosure can be seen to provide a gas turbine engine comprising the floating anchor nut in accordance with any one of the foregoing statements relating to the first aspect, a fastener assembly in accordance with any of the foregoing statements relating to the second aspect, or an assembly in accordance with any of the foregoing statements relating to the third aspect.

According to a fifth aspect, the present disclosure can be seen to provide a method of joining a first component having a first hole extending therethrough to a second component having a second hole extending therethrough. The method comprises the steps of attaching the floating anchor nut in accordance with any one of the foregoing statements relating to the first aspect to the second component by fastening the plate to the second component, wherein a portion of the body of the nut extends through the bolt aperture, aligning the first component with the second component passing a threaded shaft of a bolt through the first hole, through the second hole and into engagement with a proximal end of the nut, and tightening the bolt to a predetermined tensile load to fasten the first component to the second component.

In addition to one or more features described above, or as an alternative to any of the foregoing embodiments, the method may include providing a counter-bore in the second component aligned with the second hole. The attaching of the floating anchor nut may comprise fastening the plate to the second component so that the portion of the body of the nut protrudes through the bolt aperture to be partially accommodated in the counter-bore. The threaded shaft of the bolt may be brought into engagement with a proximal end of the nut within the counter-bore.

In addition to one or more features described above, or as an alternative to any of the foregoing embodiments, the method may include drilling the second component to provide the counter-bore. The method may also include drilling the first and/or second component to provide the first and/or second hole. The first and second holes may be through-holes linking one side of the component to the other; whereas the counter-bore may be a blind hole of wider diameter than the second hole and extending only partway through the second component, for example, between 10 to 50% of the way through the second component. The diameter of the counter-bore might be the same as or less than the diameter of the bolt aperture. Equally, the diameter of the counter-bore might be larger than the diameter of the bolt aperture.

BRIEF DESCRIPTION OF THE DRAWINGS

Various exemplary embodiments will now be described in greater detail, by way of example only, and with reference to the accompanying drawings in which:

FIGS. 2A and 2B show perspective views of the exemplary floating anchor nut of FIG. 1;

FIG. 4 shows a cross-sectional view of the exemplary fastener assembly of FIG. 1, in use, securing two components together;

FIG. 6 shows a cross-sectional view of the prior art in a typical fastening situation.

DETAILED DESCRIPTION

Figure 5:
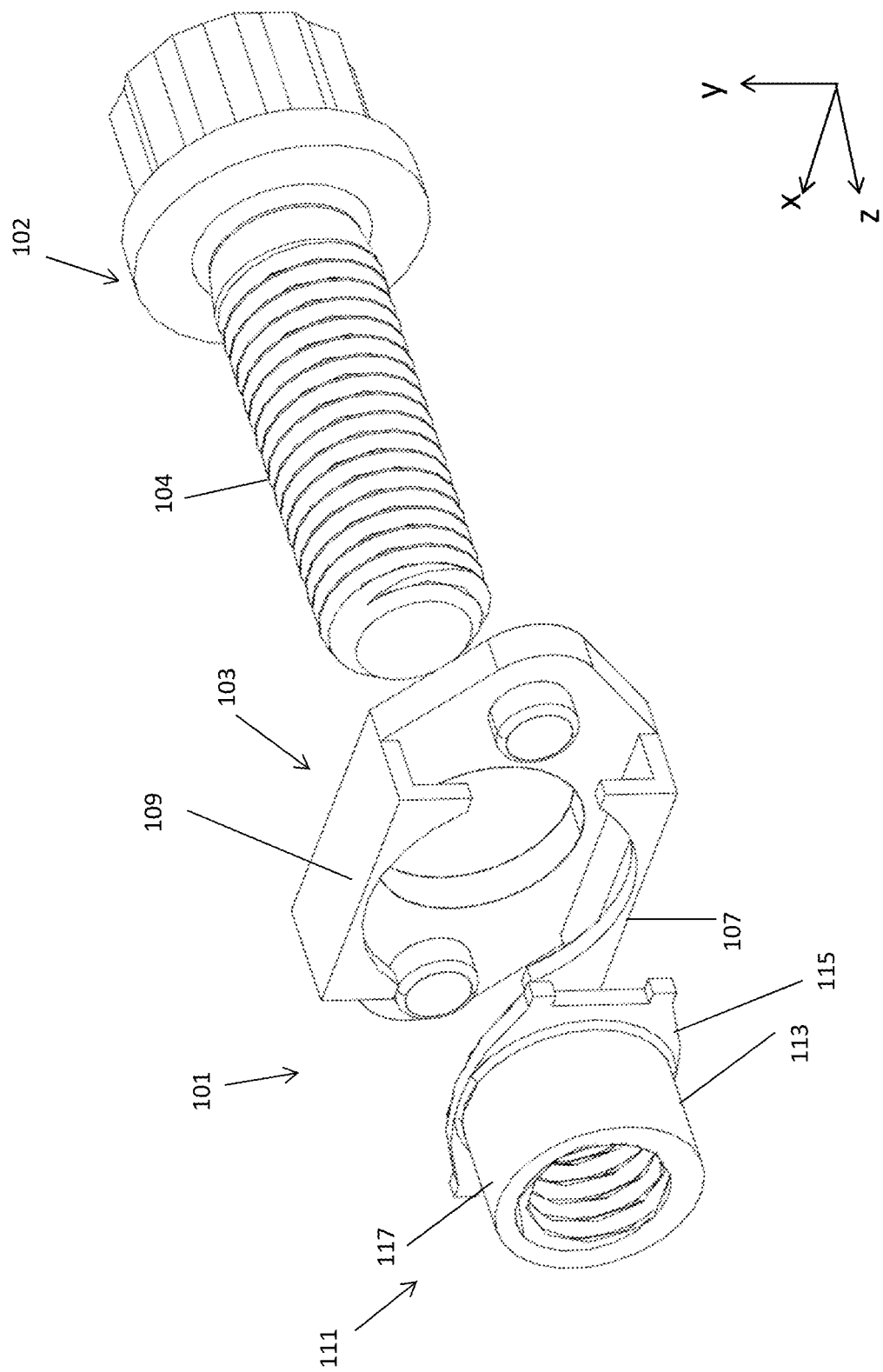
FIG. 5 shows an exploded, perspective view of a prior art floating anchor nut and bolt.

A prior art floating anchor nut is depicted in the exploded view of FIG. 5.

The floating anchor nut 101 comprises a plate 103 and a nut 111, the plate 103 defining an X-Y plane for the movement of the nut 111. The nut 111 is retained by retention features 107, 109 that engage a flange 115 extending from an outer surface 117 of the nut 111. The nut 111 comprises an internally threaded, generally cylindrical body 113, the flange 115 extending from the end of the body 113 closest to the plate 103. The flange 115 and retention features 107, 109 cooperate to retain the nut 111 with respect to the plate 103, such that limited displacement of the nut 111 is allowed in a Z direction perpendicular to an X-Y plane of the plate 103, whilst limited displacement of the nut 111 is also allowed in an X-Y plane, i.e., parallel to the plane of the plate 103. Owing to this limited displacement of the nut 111, the nut 111 is said to "float".

The body 113 of the nut 111 has a bore which is provided with an internal thread for receiving a bolt 102. The engagement of the flange 115 with the retention features 107, 109 or other features restricts the rotation of the nut 111 so that a bolt 102 can be screwed into the threaded bore when the floating anchor nut 101 is positioned on a blindside of a component.

The resulting fastener assembly 1100, comprising the floating anchor nut 111 and bolt 102, is usually intended to be used with a recommended tensile pre-load, under which, two components can be clamped together by the fastener assembly and when subject to vibrations during normal use, should not come undone.

FIG. 6 shows the known fastener assembly 1100, in use, fastening together a first and second component 140, 144, e.g., such as casings and/or housings of a gas turbine engine. During manufacture of the second component 144 or shortly before being fastened to the first component 140, the floating anchor nut 101 is secured to a blindside of a second component 144 to provide a threaded hole for the bolt 102 to engage.

As shown, the bolt 102 can be passed through a first hole 142 in a first component 140, through a second hole 146 in a second component 144 and into a threaded bore of the floating anchor nut 101. The thread of the bolt 102 engages with the thread in the body 113, enabling the first component 140 and second component 144 to be fastened together.

With this arrangement, should there be any misalignment within the normal manufacturing tolerances of the first and second components 140, 144, e.g., causing the first hole 142 and the second hole 146 to be misaligned with one another, then the nut 111 can "float" within the retention features 107, 109 of the plate 103 to accommodate for such misalignment while allowing the threads of the nut 111 and bolt 102 to engage squarely.

To meet the usual installation recommendations and achieve the prescribed tensile loading, the bolt 102 should engage the whole length of the nut's thread with at least two full thread pitches at the tip of the bolt shaft 104 protruding from the body 113. Additional bolt length might be specified to allow for manufacturing tolerances in other parts. Another consideration when selecting the fastener assembly is that the bolts 102 may only be available in certain lengths, e.g., 2.5, 5 or 10 mm length intervals for metric bolt sizes.

Sufficient clearance should be allowed for to accommodate the height of the floating anchor nut 101 and the portion of the bolt 102 that protrudes therefrom. In constrained environments, e.g., as often found in gas turbine engines, where space and access can be limited, it is not always possible to provide adequate clearance to rule out contact between the tip of the bolt shaft 104 and neighbouring components.

Moreover, manufacturer's tolerances for each component as well as restrictions due to set bolt sizes all need to be factored in when designing how the components are to be fastened together. These considerations can stack up, occasionally resulting in fouling and/or damage to a neighbouring component on a blindside of the assembly; for instance the tip of the bolt 102 may end up engaging a component 150 on the blindside of the assembly during installation. The danger then is that such damage may go unnoticed and ultimately may be the source of corrosion or a crack that could result in the component failing.

One option to avoid the possibility of fouling in such areas where there is limited space is to use a shorter bolt. However, because bolts 102 are usually available only in set lengths (e.g., of approximately 2.5 or 5 mm intervals for metric bolts 102), this may mean that the requirement for two full thread pitches to be present beyond the floating anchor nut 101 cannot always be satisfied, or at least cannot be guaranteed, taking into account other manufacturing tolerances of the other parts, e.g., the thickness of the components in the region where the bolt 102 passes though. This may reduce the potential reliability of the fastener assembly.

An exemplary fastening assembly 100 comprising a floating anchor nut 1 in accordance with the present disclosure will now be described with reference to FIGS. 1 to 3B.

Figure 1:
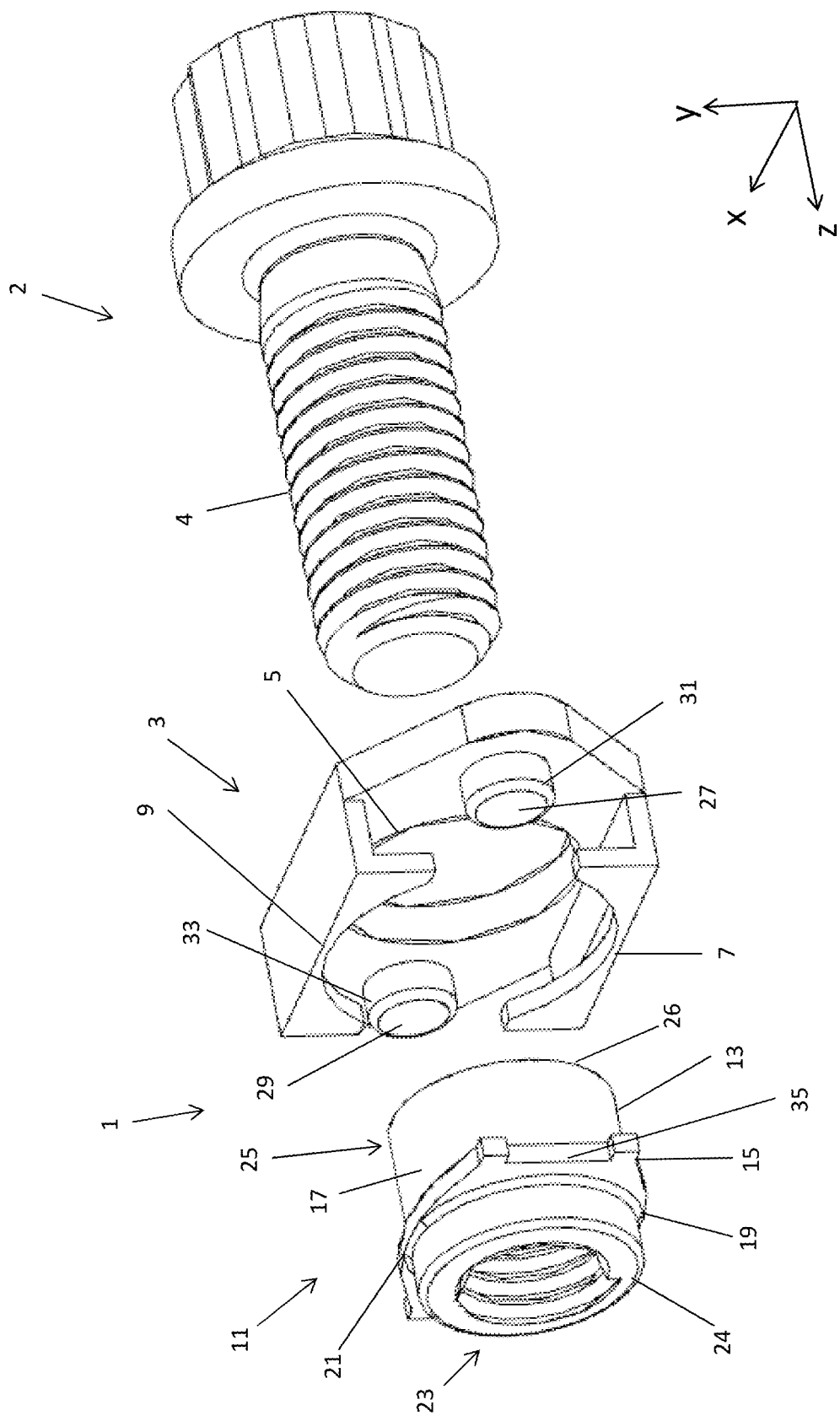
FIG. 1 shows an exploded, perspective view of an exemplary floating anchor nut and bolt (fastener assembly) in accordance with the present disclosure.

FIG. 1 shows a floating anchor nut 1 in an exploded view comprising a plate 3 and a nut 11. This same floating anchor nut can be seen in FIGS. 2A and 2B. The plate 3 extends in an X-Y plane, as with the prior art nut 111 (i.e., the X-Y plane corresponds to the flat surface of the plate 3 which abuts the nut 11). It comprises a centrally arranged bolt aperture 5 and a pair of retention features 7, 9 arranged either side to retain the nut 11 as will be explained below. One difference to note here, however, is that the bolt aperture 5 is larger than the bolt aperture 105 found in a traditional floating anchor nut.

In the depicted embodiment, the plate 3 may further comprise a first opening 27 having a lip 31 and a second opening 29 having a lip 33. The first opening 27 and the second opening 29 are arranged to receive a first fastener and second fastener respectively (not shown) for securing the plate 3 to a component, for example, on a blindside of a component, in this case a second component 44 (see FIG. 4). Other arrangements, such as plain apertures or slots, etc., may be used together with fasteners for securing the plate 3 to the component 44.

As before, the nut 11 comprises an internally threaded, generally cylindrical body 13 as well as a flange 15 extending from an outer surface 17 of the body 13.

An internal thread within a bore of the body 13 is configured to receive a similarly threaded shaft 4 of an intended bolt 2, in much the same way as the prior art. The abutment of the flange 15 against the retention features 7, 9 and the lips 31, 33, serves to ground or limit any rotation of the nut 11 with respect to the plate 3. Thus the nut 11 remains (rotationally) generally locked in position within the plate 3 for the bolt 2 to be screwed into without the installer having access to the nut 11.

Figure 3A:
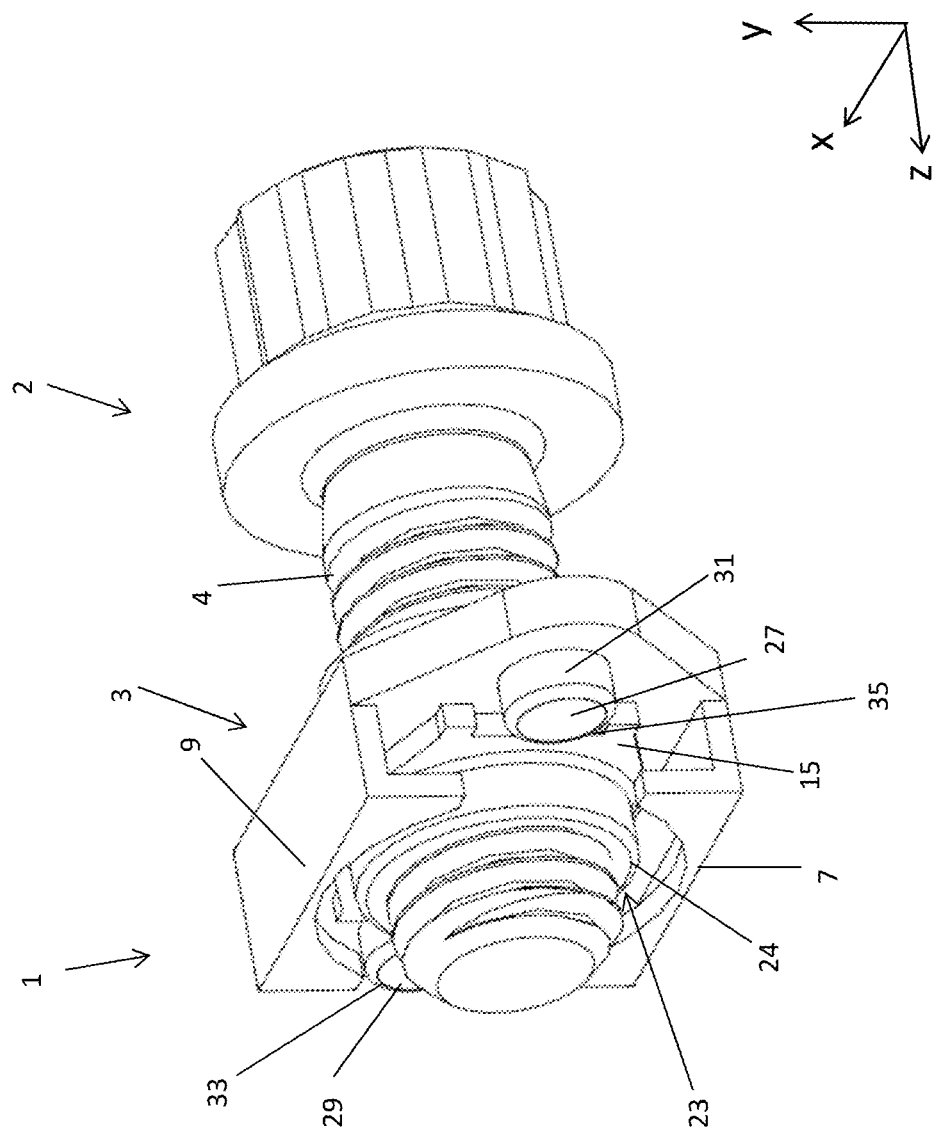
FIGS. 3A and 3B show perspective views of the exemplary fastener assembly of FIG. 1 for fastening two components together.

As shown in FIGS. 1, 2A and 3A, the flange 15 may extend in a continuous manner circumferentially around the body 13 of the nut 11. However, a flange 15 that extends only partially around the outer surface 17, or a segmented flange 15 extending from the outer surface 17 of the body 13 could be used to the same effect.

There is a difference in the axial position of the flange 15 compared to the prior art floating anchor nut 101, which will be explained further below.

The nut 11 is retained with respect to the plate 3 via interaction of the flange 15 with the retention features 7, 9 and the underlying surface of the plate 3. The retention features 7, 9 allow the nut 11 to "float" with respect to the plate 3 while maintaining its capture (i.e., they allow limited displacement of the nut in the X, Y and Z directions, as before).

In the embodiment depicted in FIGS. 1-3B, there are two retention features; a first retention feature 7 disposed at a lower side of the plate 3 and a second retention feature 9 disposed at an upper side of the plate 3. It is, however, envisioned that the plate 3 can comprise any number of retention features provided that they can retain or capture the nut 11 suitably.

The retention features 7, 9 and other points of contact are positioned so as to allow limited movement of the nut 11 in the X-Y directions.

For example, the flange 15 has a first region 19 corresponding to the first retention feature 7 and a second region 21 corresponding to the second retention feature 9. The width of the nut 11 in the Y direction provided by the extremities of the first region 19 and the second region 21 is smaller than the separation between the first and second retention features 7, 9, to allow a limited amount of movement in the Y direction.

The flange 15 further comprises a first recess 35 and a second recess 37 provided on opposite sides of the body 13. The first recess 35 provides room for the first lip 31 and/or the first fastener inserted in the first opening 27, and the second recess 37 provides room for the second lip 33 and/or the second fastener inserted in the second opening 29. The width of the nut 11 in the X direction between the first and second recesses 35, 37 is smaller than the separation between the first and second openings 27, 29, to allow a limited amount of movement in the X direction.

Thus the first and second regions 19, 21 and the first and second recesses 35, 37 allow the nut 11 to "float" in the in the X, Y directions, i.e., in a plane parallel to that of the plate 3, before parts start to engage.

The amount of X-Y displacement that the nut can undergo may be up to a few millimetres in any direction in the plane of the plate 3, or smaller, e.g., ±1 mm. For example, the permitted movement may be between 0.5 and 2 mm in any direction of the X-Y plane, e.g., greater than 0.7 mm or 0.9 mm, and/or less than 1.75 mm or 1.5 mm The interaction of the retention features 7, 9 with the flange 15 also allows for limited displacement of the nut 11 perpendicular to the plane of the plate 3, i.e. in a Z direction. As above, the retention features 7, 9 and other points of contact may be positioned so as to allow limited movement of the nut 11 in the Z direction.

The amount of Z displacement that the nut can undergo may be up to a millimetre or so perpendicular to the plane of the plate 3, or smaller, e.g., ±0.5 mm. For example, the permitted movement may be between 0.1 and 1 mm perpendicular to the plane of the plate.

Whilst the embodiments of the floating anchor nut depicted in the Figures allow for some displacement of the nut 11 in the Z direction, in other embodiments, not shown herein, the interaction of the retention features 7,9 with the flange 15 may be a closer fit.

As mentioned above, the position of the flange 15 with respect to the body 13 is different to known floating anchor nuts: it is positioned along the body away from a proximal end 26 as opposed to at the proximal end 26 (the proximal end 26 being the end of the nut 11 which is closest to the head of the bolt 2).

Thus the body 13 of the nut 11 may have a generally cylindrical form which is divided into two portions by the flange 15: a first, distal end portion 23 on a first side of the flange 15 and a second, proximal end portion 25 on a second side of the flange 15 that is engaged first by the bolt 2. Alternatively, the flange 15 may be positioned at a distal end 24 such that the body 13 of the nut 11 has a single portion extending between the flange 15 and the proximal end 26.

As shown in the embodiment of FIGS. 1-2B, the flange 15 may be provided approximately a third of the way along the length of the body 13 from the distal end 24. The flange could also be provided in a variety of other positions along the body including midway along, though a position partway along, for example, less than halfway along the body 13 from the distal end 24, can have advantages.

Figure 3B:
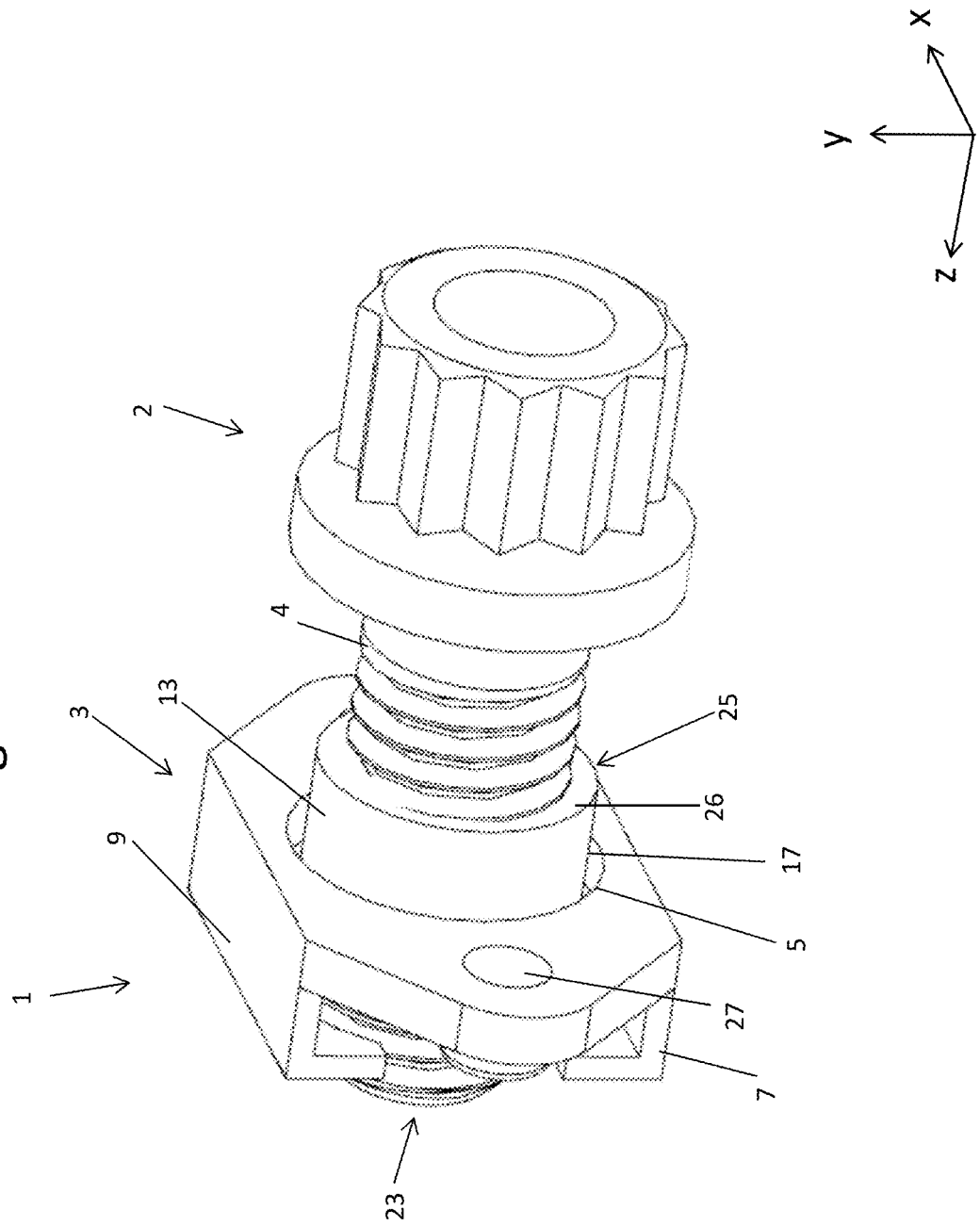

The amount of displacement of the nut 11 in the Z direction relative to plate 3 allowed for by the retention features 7, 9 is small enough to ensure that the proximal end 26 of the body 13 of the nut 11 extends through the bolt aperture 5 in the plate 3 as can be seen best in FIG. 2B. The diameter of the bolt aperture 5 is therefore larger than the diameter of the prior art plates 103. The diameter of the bolt aperture 5 now corresponds to the outer surface 17 of the body 13 with an allowance for the permitted movement of the nut 11 in the X-Y direction, as shown in FIGS. 2B and 3B.

This difference in diameters between the body 13 and the bolt aperture 5 may be greater than or equal to the difference in separations between the first and second openings 27, 29 and the first and second recesses 35, 37. The difference in diameters may also be greater than or equal to the difference in separation between the first and second retention features 7, 9 and the first and second regions 19, 21. As such, the nut 11 can still "float" in the X-Y direction parallel to the plane of the plate 3, whilst also allowing the nut 11 to "float" in the Z direction.

The bolt aperture 5 in the embodiment of FIGS. 1-3B is depicted as a circular aperture, as a hole of this shape is easy to form from known manufacturing methods, such as drilling. However, provided that the bolt aperture 5 has an area that is large enough to ensure that the nut 11 is maintained in the bolt aperture 5 in a manner that allows it to float, then the bolt aperture can conceivably take any shape, for instance the aperture might be a regular polygon.

Through the re-positioning of the flange 15, the body 13 and, hence, the internal thread of the nut 11 is counter-sunk with respect to the plate 3. 25% or more, e.g., 50% or more, of the nut 11 may be housed within the second component 44. In this way, a bolt 2 engaging the nut 11 can still engage the same length of thread while needing to protrude by a smaller extent from the surface of the plate 3.

An exemplary use of the floating anchor nut 1 and bolt 3 can be seen in FIG. 4.

FIG. 4 shows an assembly, for instance an air cooled oil cooler assembly in a gas turbine engine, comprising a first component 40 having a first hole 42 and a second component 44 having a second hole 46. A counter-bore 48 (the purpose of which will be described further below) is provided on the blindside of the second component 44 aligned with the second hole 46. In the assembly, the first component 40 is positioned adjacent to the second component 44, with the first hole 42 being adjacent and generally aligned with the second hole 46, and the counter-bore 48 being on the blindside, spaced from the first hole 42.

The first and second components 40, 44 of the assembly are fastened together by a fastener assembly 100 comprising a bolt 2 and the floating anchor nut 1 as described above. The floating anchor nut 1 is fastened to the second component 44 with a first fastener (not shown) extending through the first opening 27 and a second fastener (not shown) extending through the second opening 29 and into the second component 44. The floating anchor nut 1 may be attached to the rear surface of the second component 44 during the component manufacture stage. The counter-bore 48 may be formed in the second component 44, e.g., by drilling or pre-forming in a casting, prior to the attachment of the floating anchor nut 1.

The proximal end portion 25 of the body 13, extending through the bolt aperture 5, is accommodated by the counter-bore 48. Thus the proximal end 26 and a portion of the body 13 extending beyond the plate 3 is housed in the second component 44, within the counter-bore 48.

Thus the method may comprise the steps of drilling a counter-bore 48 in the second component 44 of larger diameter than a through-hole for the bolt 2, and attaching the plate 3 to the second component 44 with a portion of the nut 11 protruding into the counter-bore 48.

The shaft 4 of the bolt 2 extends through the first hole 42 in the first component 40, through the second hole 46 in the second component 44 and into the internally threaded body 13 that is partially countersunk into the second component 44. The engagement of the threads for the full length of the body 13 ensures that the bolt 2 can transfer the necessary tensile loadings to the floating anchor nut 1. The tip of the threaded shaft 4 of the bolt 2 can also extend beyond the distal end 24 of the body 13 by at least two full thread pitches. This helps to ensure that the intended tensile loadings can be used reliably. It further ensures that the completion of fastening can be inspected by eye, where there is sight-access to this region. Any misalignment in the holes of the components 40, 44 can be taken up through the permitted "floating" of the nut 11 within the plate 3.

Accordingly, the interaction of the bolt 2 and the floating anchor nut 1 can provide a secure fastener assembly extending between the first component 40 and the second component 44 to clamp them together.

Whilst not depicted in the Figures, the body 13 may be deformed slightly at the distal end 24, for example, by ovalising, such that the internal thread of the nut 11 pinches slightly against regions of the bolt 2 and/or may also be out of its normal alignment. This subtle deformation in the thread helps to prevent the bolt 2 from working loose when subject to vibrations. Other systems could also be employed to restrict the nut and bolt working loose, for example, an adhesive, a polymer collar, or other such measure.

In the assembly 100 of FIG. 4, as in the prior art assembly 1100 of FIG. 6, the floating anchor nut 1 ensures that the first component 40 and the second component 44 are fastened together securely even when there is a slight misalignment due to the usual engineering tolerances. The limited parallel displacement of the nut 11 allows the nut to slightly alter its position in a direction parallel to the plate 3 to accommodate any such misalignment. Thus the bolt 2 can always be received squarely in the nut 11 regardless of possible misalignment in the components 40, 44.

The fastener assembly 100 also provides improved blindside clearance over known assemblies 1100. As can be seen in FIG. 4, because the flange 15 is provided along the body 13 of the nut 11 away from the distal end 24, a portion of the body 13 near the proximal end 26 extends through the bolt aperture 5. Thus, the proximal end 26 of the nut 11 is counter-sunk into the second component 44, and in particular is accommodated within the counter-bore 48. As such, less of the nut 11 extends from the outer surface of the plate 3. Hence, a shorter bolt 2 may be used which extends a smaller distance from the surface of the second component 44 while maintaining the same length of threaded contact.

In the scenario where the fastener assembly 100 is located close to another component 50, for instance a fluid tank 50, e.g., an air cooled oil cooler, the separation between the tank 50 and the tip of the bolt 2 can be increased by using a shorter bolt as a result of the flange 15 being disposed partway along the body 13. Therefore, the risk of a bolt 2 causing damage to or fouling the tank 50 (or other components in other scenarios) is decreased compared with the prior art fastener assembly 1100.

Greater clearance can be achieved by positioning the flange 15 closer to, or at, the distal end 24 of the body 13. However, a balance must be struck between the desired clearance and the amount of material that must be removed from the second component 44 to form a counter-bore 48 large enough to accommodate the portion of the body 13 extending through the bolt aperture 5. Should too much material be removed from the second component 44 then the integrity of the fastening between the two components 40, 44 may be weakened beyond usefulness.

The use of a floating anchor nut 1 according to the present disclosure allows for the weight of the fastener assembly 100 to be reduced compared with assemblies known in the prior art. As the nut 11 is at least partially counter-sunk within the second component 44, a shorter bolt 2 can be used while still achieving the same amount of threaded engagement. On a metric arrangement, this might mean a bolt 2 which is 2.5 mm or 5 mm shorter is used (e.g., by moving the flange 15 a distance of 2.5 mm or 5 mm or so along the body 13 of the nut 11 away from the proximal end 26). Other savings in weight can be gained through removal of material in the second component 44 to provide the counter-bore 48. In addition, a bigger bolt aperture 5 is provided in the plate 3 to accommodate the nut 11, thus less material is used in the plate 3 too compared with the plate 103 of the assembly 1100. By itself this might amount to just a few tens of grams in the weight of the fastener assembly 100; however in a gas turbine engine many hundreds of these floating anchor nuts will be in use, and accordingly there is a potential for a significant amount of weight to be saved. Whilst the apparatus of the disclosure has been shown and described with reference to embodiments, those skilled in the art will readily appreciate that changes and/or modifications may be made thereto without departing from the scope of the subject disclosure.

The invention claimed is:

1. An assembly comprising:
a first component having a first hole;
a second component adjacent to the first component, the second component having a second hole, the first and second component being arranged such the first hole is adjacent to and aligned with the second hole;
a floating anchor nut configured to receive a bolt, the floating anchor nut comprising:
a plate; and
a nut,
wherein:
the plate has a bolt aperture and retention features for retaining the nut; and
the nut comprises:
a body that is internally threaded; and
a flange extending from an outer surface of the body, the nut being retained through interaction of the flange with the retention features, the retention features allow for limited parallel displacement with respect to a plane of the plate,
wherein the flange is positioned along the body so that at least a portion of the body is counter-sunk into the bolt aperture of the plate;
wherein the plate is fastened to the second component such that the bolt aperture is aligned with the second hole, and wherein a portion of the body of the nut extends through the bolt aperture; and
a bolt having a threaded shaft which extends through the first and second holes and is received in the internally threaded body, whereby the first component and the second component are fastened together;
wherein the second component includes a counter-bore aligned with the second hole, the plate is fastened to the second component such that the bolt aperture is aligned with the counter-bore and wherein a portion of the body of the nut protrudes through the bolt aperture and is accommodated in the counter-bore.

2. The assembly of claim 1, wherein the body of the nut is generally cylindrical and the bolt aperture is a circular aperture having a diameter larger than the diameter of the body.

3. The assembly of claim 2, wherein the body is displaceable within an annular region of clearance in the bolt aperture.

4. The assembly of claim 1, wherein the flange is provided partway along the body such that a distal end portion of the body protrudes from one side of the flange and a proximal end portion of the body protrudes from the other side of the flange.

5. The assembly of claim 4, wherein the flange is provided less than halfway along the length of the body from a distal end.

6. The assembly of claim 5, wherein the flange is provided around a third of the way along the length of the body from the distal end.

7. The assembly of claim 4, wherein the internal thread of the body in the distal end portion has been deformed.

8. The assembly of claim 7, wherein the internal thread of the body in the distal end portion has been ovalized.

9. The assembly of claim 1, wherein the plate has a first retention feature and a second retention feature arranged on opposite sides of the bolt aperture that interact with the flange.

10. The assembly of claim 1, wherein the plate has a first opening and a second opening each configured to receive a fastener, wherein the first opening has a first lip and the second opening has a second lip.

11. The assembly of claim 10, wherein the flange has a first recess configured to provide room for the first lip and/or a fastener received in the first opening, and a second recess configured to provide room for the second lip and/or a fastener received in the second opening.

12. The assembly of claim 1, wherein the threaded shaft extends through the body and protrudes by at least two full thread pitches beyond the body.

13. The assembly of claim 1, wherein the assembly is an air cooled oil cooler assembly of a gas turbine engine.

14. A method of joining a first component having a first hole to a second component having a second hole using a floating anchor nut to form the assembly of claim 1, wherein the floating anchor nut is configured to receive a bolt, the floating anchor nut comprising a plate and a nut, wherein:

the plate has a bolt aperture and retention features for retaining the nut; and the nut comprises:

a body that is internally threaded; and a flange extending from an outer surface of the body, the nut being retained through interaction of the flange with the retention features, the retention features allow for limited parallel displacement with respect to a plane of the plate, wherein the flange is positioned along the body so that at least a portion of the body is counter-sunk into the bolt aperture of the plate;

wherein the method comprises:

providing a counter-bore in the second component aligned with the second hole;

fastening the plate to the second component so that the portion of the body of the nut protrudes through the bolt aperture and is partially accommodated in the counter-bore;

aligning the first component with the second component;

passing a threaded shaft of a bolt through the first hole, through the second hole and into engagement with a proximal end of the nut, wherein the threaded shaft of the bolt is brought into engagement with a proximal end of the nut within the counter-bore; and tightening the bolt to a predetermined tensile load to fasten the first component to the second component.

\* \* \* \* \*